US008596431B2

(12) United States Patent
Bruder

(10) Patent No.: US 8,596,431 B2
(45) Date of Patent: Dec. 3, 2013

(54) PNEUMATIC CYLINDER WITH A SELF-ADJUSTING END POSITION DAMPING ARRANGEMENT, AND METHOD FOR SELF-ADJUSTING END POSITION DAMPING

(75) Inventor: Christian Bruder, Werdohl (DE)

(73) Assignee: Parker Origa Holding AG, Zug (CH)

( * ) Notice: Subject to any disclaimer, the term of this patent is extended or adjusted under 35 U.S.C. 154(b) by 1126 days.

(21) Appl. No.: 12/153,620

(22) Filed: May 21, 2008

(65) Prior Publication Data

US 2008/0289920 A1 Nov. 27, 2008

(30) Foreign Application Priority Data

May 24, 2007 (AT) .................................... 828/2007
May 5, 2008 (AT) .................................... 714/2008

(51) Int. Cl.
*F16F 9/02* (2006.01)
*F16F 9/24* (2006.01)

(52) U.S. Cl.
USPC .................... 188/297; 188/266.4; 188/266.7; 188/282.4; 188/286; 91/308; 91/317; 91/394; 91/396; 91/409; 267/25; 267/64.16

(58) Field of Classification Search
USPC ............. 188/286, 289, 297; 91/26, 395, 396, 91/405, 406, 420, 308; 92/255; 60/413–414
IPC .................................. F15B 15/08,15/14, 15/22
See application file for complete search history.

(56) References Cited

U.S. PATENT DOCUMENTS

| | | | | |
|---|---|---|---|---|
| 3,613,503 | A | 10/1971 | Phillips | |
| 3,786,724 | A | 1/1974 | Martin | |
| 3,889,576 | A * | 6/1975 | Sheffer et al. | 91/394 |
| 3,933,080 | A * | 1/1976 | Corrie | 91/394 |
| 4,500,075 | A * | 2/1985 | Tsuchiya et al. | 267/226 |
| 5,069,317 | A * | 12/1991 | Stoll et al. | 188/286 |
| 5,307,729 | A * | 5/1994 | Hedlund | 91/394 |
| 6,047,627 | A | 4/2000 | Bueter | |
| 7,021,192 | B2 * | 4/2006 | Kita et al. | 91/394 |

FOREIGN PATENT DOCUMENTS

| | | | | |
|---|---|---|---|---|
| EP | 1416166 | | 5/2004 | |
| EP | 1574722 | A2 * | 9/2005 | F15B 15/22 |
| GB | 1592643 | | 7/1981 | |
| JP | 08093719 | A * | 4/1996 | F15B 15/24 |

* cited by examiner

*Primary Examiner* — Robert A Siconolfi
*Assistant Examiner* — San Aung
(74) *Attorney, Agent, or Firm* — Dykema Gossett PLLC

(57) ABSTRACT

A self-adjusting end position damping arrangement includes a stroke space 9 which is delimited by a movable stroke element 7, 24 and a part of the pneumatic cylinder 1, with the stroke space 9 being connected via a connecting duct 14 to the working pressure $P_1$ which acts on the cylinder piston 22 or to the ventilation pressure ($P_3$) in the outlet duct 3 and the stroke element 7, 24 being acted on via a damping duct 16 by the damping pressure $P_2$ in the damping volume 19, a non-return valve 12 is arranged in the connecting duct 14 upstream of the stroke space 9, which non-return valve 12 blocks in the direction of the working pressure $P_1$ or the ventilation pressure ($P_3$), respectively, and a ventilation duct 5 is provided, which ventilation duct 5 can be opened by means of the movable stroke element 7, 24 and which is connected to an outlet duct 3.

13 Claims, 5 Drawing Sheets

PNEUMATIC CYLINDER WITH A SELF-ADJUSTING END POSITION DAMPING ARRANGEMENT, AND METHOD FOR SELF-ADJUSTING END POSITION DAMPING

BACKGROUND OF THE INVENTION

1. Field of the Invention

The invention relates to a pneumatic cylinder with a self-adjusting end position damping arrangement and having a cylinder housing in which is arranged a movable cylinder piston which is acted on at one side by a working pressure, and in which a damping volume which is delimited from the non-pressurized side of the cylinder piston is formed in the region of the end position of the cylinder piston as a result of the movement of the cylinder piston, and to a method for self-adjusting end position damping.

2. The Prior Art

In hydraulic or pneumatic cylinders, an end position damping arrangement is often used in order to prevent the piston from impacting, in the end position, against the cylinder housing or against a stop. It is accordingly an aim of the invention to reduce the speed of a moved mass (piston+load), whose centre of gravity generally lies in the cylinder axis, to a level at which neither the cylinder nor the machine in which the cylinder is installed is damaged or adversely affected by shocks which are generated.

In a known pneumatic cylinder which includes a movable cylinder piston 22 that divides the interior of the cylinder into a first variable-volume chamber 40 containing a piston fluid at pressure ($p_1$) and a second variable-volume chamber 50 containing an end position damping arrangement, as per FIG. 1, at the end of the working stroke, in the region of the end stop of the cylinder piston 22, a damping piston 18 is guided by means of a damping seal 21 in a recess 23 of the cylinder piston 22 (indicated by dashed lines), as a result of which an additional chamber is created in the non-pressurized cylinder side —the damping volume 19. The damping volume 19 which is now generated can escape only via a provided valve needle (not illustrated here), for example in the cylinder cover 4. When the cylinder piston 22 retracts, the air which collects in the chamber is compressed and, as a result of the movement of the piston, conducted past the valve needle. The volume however cannot be discharged in the same amount of time as it takes for the piston to retract, as a result of which a pressure rise occurs in said chamber. The piston is retarded by means of said pressure and, in this way, should not impact against the cylinder cover or an end stop but rather should retract slowly with the time-delayed escape of the air. Here, the valve needle is adjusted when the cylinder is first operated. This form of end position damping can be found in many pneumatic or hydraulic cylinders which have an end position damping arrangement such as for example in a piston-rod-less pneumatic cylinder 1 as illustrated in FIG. 1. The disadvantage of said end position damping arrangement is that, as a result of the fixed adjustment of the valve needle, only a certain amount of kinetic energy can be dissipated. A change in the mass m to be damped (for example because the load changes) and/or in the speed v of the piston would require a renewed adjustment, which is however not always possible or is complex in practice. As a result of the complex interaction of mass, speed and end position pressure, the adjustment of the end position damping arrangement is time-consuming and, as a result of the high shock loading in the region of the mechanical end stop, not ideal. This reduces the service life of the cylinder. Furthermore, the adjustment is often carried out inadequately or is even forgotten entirely; this also results in oscillations in the end position and therefore lengthened cycle times.

Also known, for example from EP 949 422 A1, are travel-dependent end position damping arrangements which vary a discharge air cross section as a function of the piston position and can therefore predefine a progressive damping profile. Said damping profile is however dependent on the fixedly predefined geometry and can therefore be optimal only for a certain combination of mass and speed. If the pneumatic cylinder is operated outside the optimum operating point, for example if the working pressure (and therefore the speed) changes or if a different load is moved, the damping is no longer optimal. However, precisely this is the case in practice, since it has been found that the positions at which the pressure peaks occur are different depending on the loading and speed.

Likewise known, for example from DE 37 40 669 A1, are pneumatic shock absorbers with an outlet valve via which the air which is compressed during a damping movement of the piston is discharged. For this purpose, a valve plunger is preloaded by the working pressure and a spring force. If the force of the compressed air exceeds the preload, the outlet valve opens abruptly and the compressed air is expanded via a throttle. In order to be able to operate a shock absorber of said type optimally, a controller is provided, by means of which the pilot pressure counter to which the piston is moved is controlled as a function of the position of the piston. With control of said type, it is possible to obtain self-adjusting damping, but only with a high level of control expenditure.

The present invention is based on the object of specifying an end position damping arrangement of a pneumatic cylinder, and an associated method, which adjusts automatically to different operating parameters, such as for example mass, speed and working pressure, in order to obtain optimum damping within a wide range, and which is of simple and cost-effective design.

SUMMARY OF THE INVENTION

This object is achieved according to the invention in that the end position damping arrangement includes a stroke space which is delimited by a movable stroke element and a part of the pneumatic cylinder, with the stroke space being connected via a connecting duct to the working pressure which acts on the cylinder piston or to the ventilation pressure in the outlet duct and the stroke element being acted on via a damping duct by the damping pressure in the damping volume, a non-return valve is arranged in the connecting duct upstream of the stroke space, which non-return valve blocks in the direction of the working pressure or the ventilation pressure, respectively, and in that a ventilation duct is provided, which ventilation duct can be opened by means of the movable stroke element and which is connected to an outlet duct. The method according to the invention is defined in that a damping pressure is generated in the damping volume as a result of the movement of the cylinder piston, which damping pressure acts on a stroke element, the stroke element is moved by the damping pressure counter to a pressure medium volume which is closed off in a stroke space and which is acted on with the working pressure or the ventilation pressure, and a ventilation duct is opened as a result of the movement of the stroke element. As a result of said arrangement and said method, an adaptive gas spring with a progressive spring stiffness is generated in the stroke space, which progressive spring stiffness is dependent on the working pressure or the ventilation pressure and on the pressure in the end position damping space. In this way, the effective discharge cross section is opened progressively, as a result of which a virtually linear opening function is provided. Here, the spring constant of said gas spring varies automatically as a function of the prevailing pressures, and a uniform damping action is obtained even under different operating pressures and different levels of kinetic energy. The ventilation pressure is advantageously used for the adaptive gas spring, since the pressure curve on the ventilation side shows a more distinct dependency from the movement velocity of the cylinder piston and, hence, is more suitable as control variable. The invention thereby increases the comfort, the operational reliability and the user-friendliness of the pneumatic drive. As a result of the automatic adaptation of the end position damping to the operating conditions, the costs for the manual adjustment and the cycle times are also reduced.

The damping volume is advantageously formed by virtue of a damping pin which extends in the axial direction into the cylinder housing being arranged in the region of the end stop of the cylinder piston, and the cylinder piston being formed with a recess which can receive the damping pin. In this way, the cylinder volume is divided, in order to form the damping volume, as the damping pin travels into the recess. Alternatively, the damping volume can also be formed by virtue of an outlet duct being arranged laterally on the cylinder housing and axially spaced apart from the cylinder cover.

In one preferred embodiment, the stroke element is formed as a damping piston which is mounted in a guided fashion in the stroke space. Here, the stroke space or the damping piston can, depending on the structural design, be arranged either in a cylinder cover which closes off the pneumatic cylinder or in the cylinder piston.

The stroke element can alternatively also be a sealing element between the damping pin and the cylinder piston, with the sealing element being hollow and being arranged in the cylinder piston. With an arrangement of said type, it is possible for the number of components required for the end position damping arrangement to be reduced.

In order to prevent or reduce a possible oscillation of the cylinder piston as it impinges on the air volume enclosed in the damping volume, it is possible for a ventilation cross section to be provided on the pneumatic cylinder, which ventilation cross section is connected to the damping volume.

BRIEF DESCRIPTION OF THE DRAWINGS

The invention which forms the subject matter is described below on the basis of the schematic, non-restrictive FIGS. 2 to 4 which show preferred embodiments of the invention, and in which.

DETAILED DESCRIPTION OF THE PREFERRED EMBODIMENTS

Figure 1:
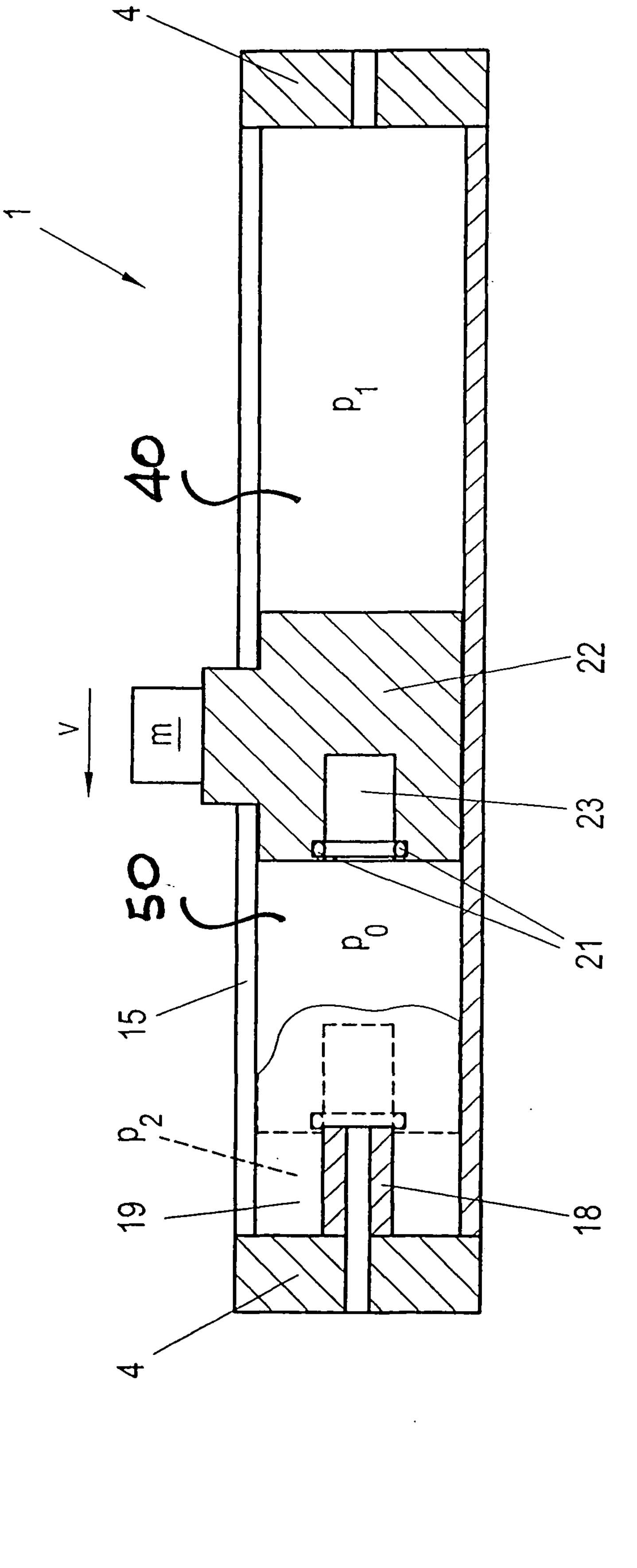
Fig. 1 (PRIOR ART)
FIG. 1 shows a known piston-rod-less pneumatic cylinder.
Figure 2:
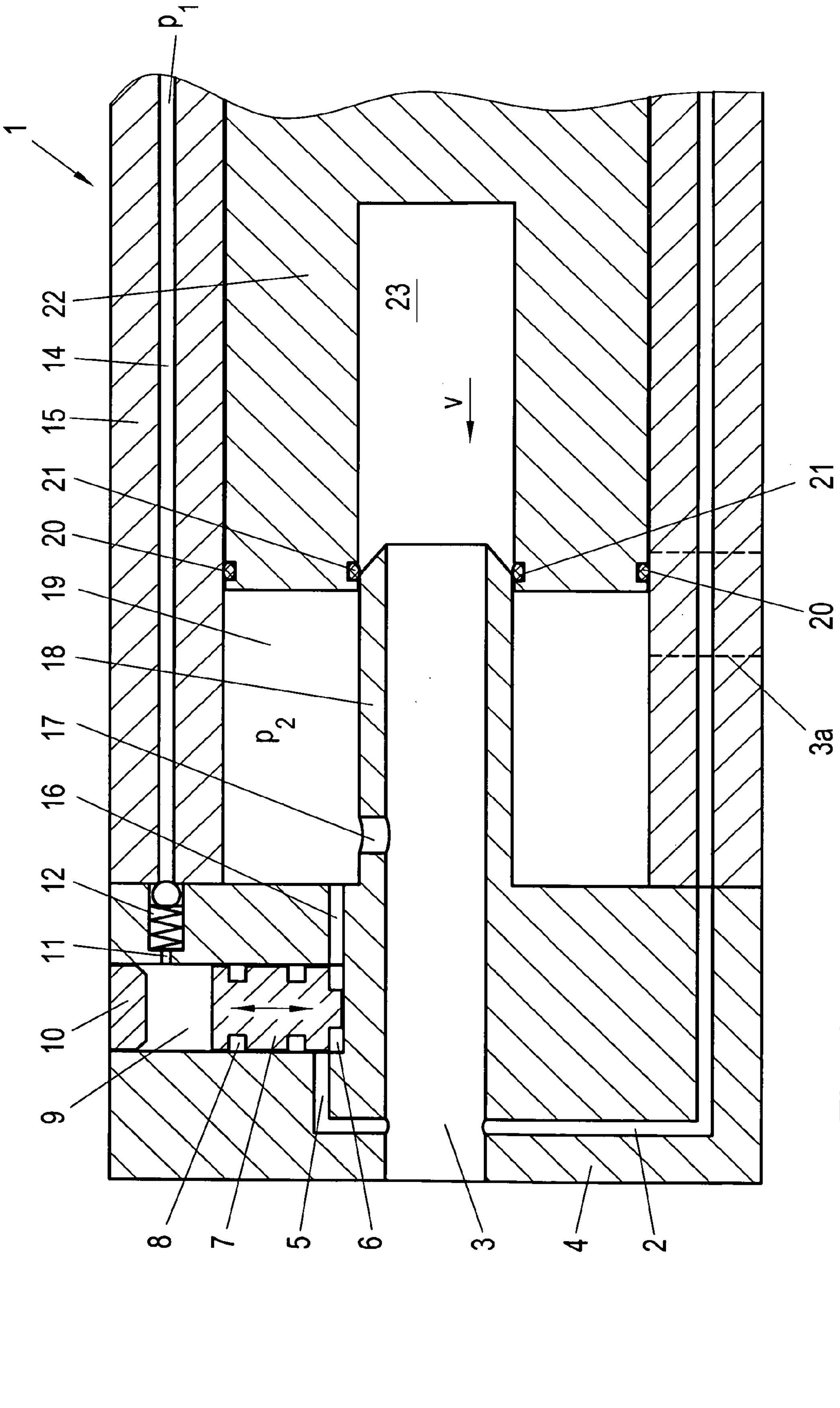
FIG. 2 shows a design of the invention with the end position damping arrangement in the cylinder cover.

FIG. 2 shows, in detail, an end region, in this case the end closed off by the cylinder cover 4, of a pneumatic cylinder 1, in this case a piston-rod-less pneumatic cylinder, having a self-adjusting end position damping arrangement according to the invention. The cylinder piston 22 is connected, for example by means of a carriage, to a mass m and moves under a pressure loading $p_1$ at one of its sides with a speed v in a cylinder housing 15 in the direction of the mechanical end stop (in the region of the cylinder cover 4). The cylinder piston 22 is sealed off with respect to the cylinder housing in a known way by means of sealing elements 20. The movement direction is indicated in FIG. 2 by means of the arrow. The air, which is compressed as a result of the movement, on the non-pressurized side of the cylinder piston 22 is discharged here via a duct 3 in the cylinder cover 4 and a connection (not illustrated here).

Provided in the cylinder piston 22 is a recess 23 which can receive a damping pin 18 which extends axially into the cylinder housing 15. The damping pin 18 is in this example arranged on the cylinder cover 4 and in the end region or in the region of an end position of the cylinder piston 22 of the pneumatic cylinder 1, as a result of which a damping region is generated. An outlet duct 3 extends here in the axial direction through the cylinder cover 4 and through the damping pin 18. A damping volume 19 of said type can of course also be formed in some other way, especially without damping pin 18, for example by virtue of the outlet duct 3 being arranged on the cylinder housing 15 laterally and spaced apart in the axial direction from the cylinder cover 4, as indicated in FIG. 2 by the dashed line and with reference numeral 3*a*. In this way, the outlet duct 3*a* is closed off during the movement of the cylinder piston 22, as a result of which a corresponding damping volume 19 is again generated in the region of the end position of the cylinder piston 22 between cylinder cover 4 and cylinder piston 22.

Provided in the cylinder cover 4 is a stroke space 9—in this case a simple bore which is closed off by a disc 10. The stroke space 9 is delimited by a stroke element, in this case a damping piston 7, which is arranged in a movable (indicated by the double arrow in FIG. 2) and guided fashion in the stroke space 9. The stroke space 9 is in this case connected by means of a duct 11 in the cylinder cover 4 and a connecting duct 14 arranged in the cylinder housing 15 to the working pressure $p_1$ on the pressurized side of the cylinder piston 22.

A non-return valve 12 is arranged in the connecting duct 14 or, as in this example, in the duct 11 in the cylinder cover 4, which non-return valve 12 blocks in the direction of the working pressure $p_1$. The damping piston 7 is therefore acted on with pressure at one side by the working pressure $p_1$ acting in the stroke space 9. The opposite side 6 of the damping piston 7 is in this example of stepped design and is connected by means of a damping duct 16 to the damping volume 19. The damping piston 7 closes off a ventilation duct 5 which is arranged in the cylinder cover 4 and which is connected to the outlet duct 3. The damping piston 7 can be provided with throttle grooves 8 for sealing with respect to the cylinder cover 4. Instead of the throttle grooves 8, it is however also possible for any other desired sealing elements to be provided. In order to be able to adjust the new working pressure $p_1$ in the stroke space 9 in the event of a change in working pressure from one stroke to the next, it is also possible for a targeted leakage to be provided via the throttle grooves 8 or the other sealing elements at this point for pressure dissipation in the stroke space 9. It is of course likewise conceivable for the stroke space 9 to be ventilated or acted on with the new working pressure $p_1$ between two strokes if necessary by means of other suitable devices such as for example a valve or a throttle.

An end position damping arrangement of said type can of course also be provided at the other side of the pneumatic cylinder, so that the movement in the opposite direction is correspondingly damped in the end position. For this purpose, it is possible for the same arrangement to be provided on the other side, and the working pressure which then acts is supplied via the second connecting duct 2 to the second stroke space 9.

The function of the end position damping arrangement according to the invention is described below.

During the movement of the cylinder piston 22, the compressed air on that side of the cylinder piston 22 which is remote from the pressurized side is discharged through the outlet duct 3. Here, the outlet duct 3 is advantageously dimensioned such that all of the compressed air can be discharged without a back pressure (and therefore without the associated pressure rise). When the cylinder piston 22, in the region of the end position of the cylinder piston 22, as a result of the movement, runs onto the damping pin 18, the latter is guided through a damping device 21 which is arranged in the recess 23 of the cylinder piston 22, as a result of which the cylinder space is divided by the damping device 21. As a result, a closed-off chamber is generated at the end of the movement of the cylinder piston 22—the damping volume 19, in which the air which remains therein is compressed for damping the cylinder piston 22 as a result of its movement. Said damping pressure $p_2$ in the damping volume 19 acts via the damping duct 16 on that side 6 of the damping piston 7 whose side facing toward the stroke space 9 is simultaneously acted on with the working pressure $p_1$ via the connecting duct 14. If the damping pressure $p_2$ in the damping volume 19 now exceeds the working pressure $p_1$ as a result of the further movement of the cylinder piston 22, the damping piston 7 is lifted, as a result of which the air in the stroke space 9 is compressed since the non-return valve 12 prevents a return flow of the air. As a result of the stroke of the damping piston 7, the ventilation duct 5 is opened and the air which is enclosed in the damping volume 19 begins to flow out via the damping duct 16, the ventilation duct 5 and the outflow duct 3. The air volume enclosed in the stroke space 9 generates a gas spring with a progressive spring stiffness $$C_L = \frac{A_K^2}{V} E_L,$$

where $A_K$ is the area of the damping piston, V is the enclosed volume which is dependent on the acting pressures, and $E_L$ is the modulus of elasticity of the air, which is given by P*n, the pressure multiplied by the polytropic exponent. Said adaptive gas spring counteracts the stroke of the damping element 7, as a result of which the outflow cross section is opened not abruptly but rather progressively and as a function of the prevailing working pressure $p_1$. Here, the opening function behaves approximately linearly in relation to the pressure. The spring constant of said gas spring is determined by the volume and the pressure of the air volume. If the working pressure is varied, the spring constant of the gas spring also varies. If the kinetic energy of the cylinder piston 22 varies, for example as a result of a higher speed v or a different mass m, the stroke of the damping element 7 and therefore also the damping behaviour automatically adapt, by means of different pressure conditions, to the new conditions. This functions in a certain energy range, wherein the maximum damping energy may not be exceeded. The characteristic curve of the damping function moves under different working pressures.

If the opening pressure is not reached in the damping space 19, for example as a result of very low speeds when transporting very small masses, there is the risk of oscillation. The oscillation is generated as a result of the impingement of the cylinder piston 22 against the air cushion which is formed in the damping space 19, since the enclosed air cannot escape. Said oscillation can be counteracted for example by means of a targeted introduction of one (or more) ventilation opening (s) 17, for example in the damping pin 18 or in the cylinder housing 15. Here, the ventilation opening 17 can be adapted in terms of their shape, position and size to the conditions, that is to say to the structural design or the levels of kinetic energy which are to be expected.

Figure 3:
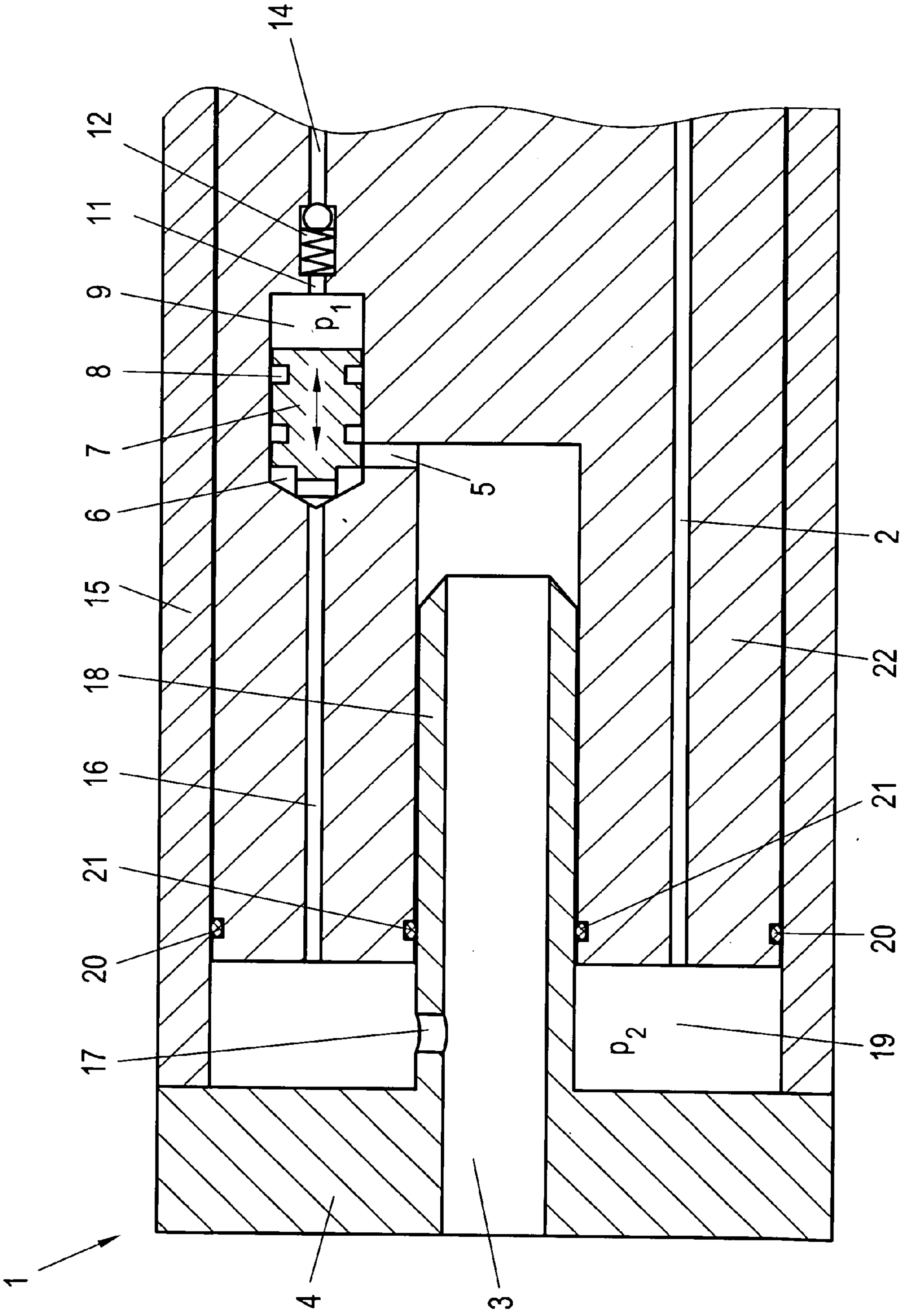
FIG. 3 shows a design of the invention with the end position damping arrangement in the cylinder piston.

FIG. 3 shows an alternative embodiment of a self-adjusting end position damping arrangement according to the invention. In this embodiment, the stroke space 9 is arranged in the cylinder piston 22, as is the connecting duct 14, the non-return valve 12, the damping duct 16 and the ventilation duct 5. The functioning of said end position damping arrangement is otherwise identical to that described with reference to FIG. 2.

Figure 4:
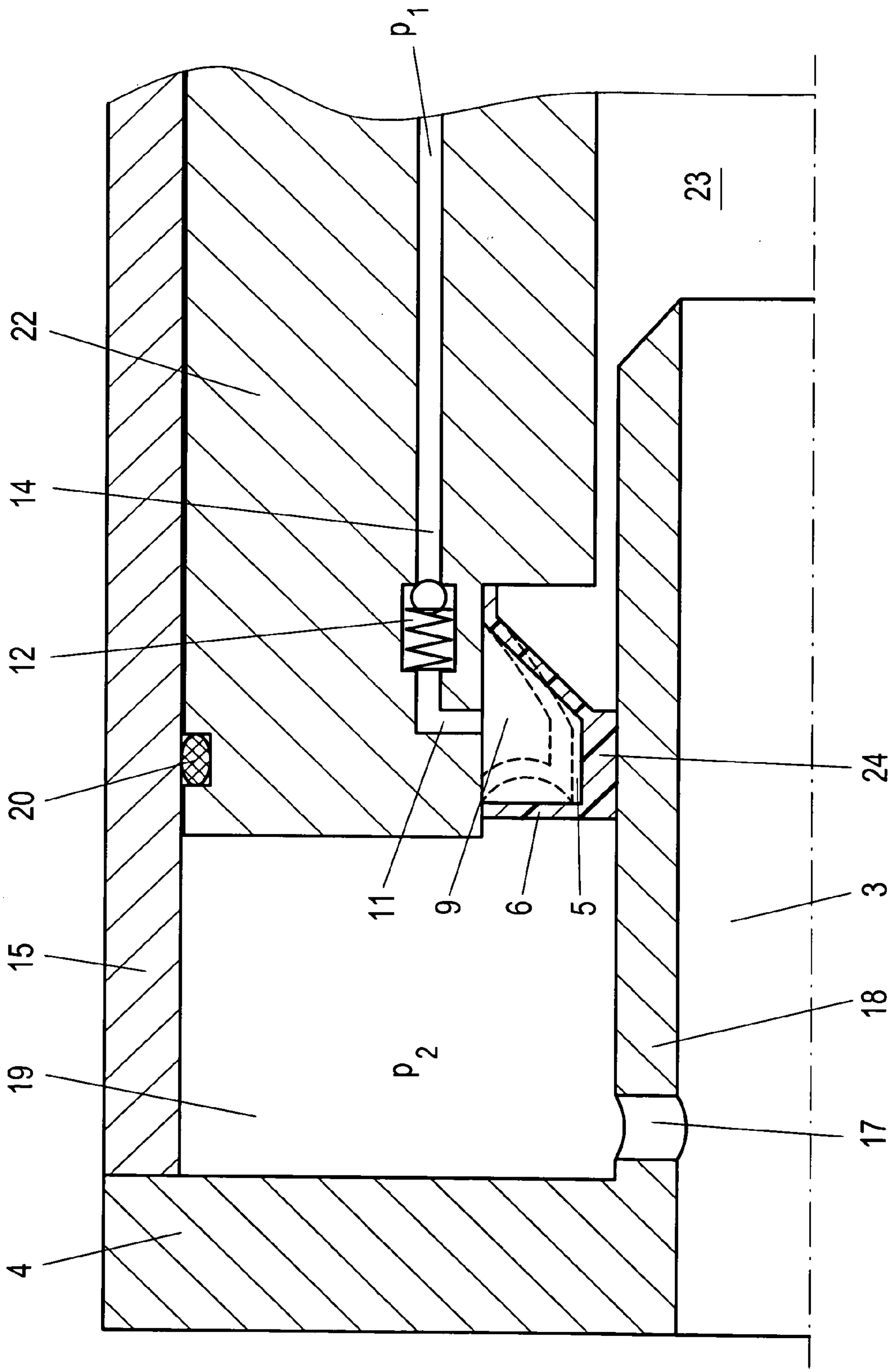
FIG. 4 shows a design of the end position damping arrangement as a damping seal and FIG. 5 shows a design of the invention with pressure supply to the adaptive gas spring from the ventilation side.

FIG. 4 shows a further possible embodiment of the invention. In this example, the stroke element is designed as an elastic damping seal 24. Here, the damping seal 24 is arranged at the recess 23 of the cylinder piston 22. Here, the damping seal 24 is of hollow design and therefore forms a volume between the cylinder piston 22 and the damping seal—the stroke space 9. As the cylinder piston 22 runs onto the damping pin 18, the damping seal 24 again divides the cylinder volume, as a result of which the damping volume 19 is again generated. As a result of the further movement of the cylinder piston 22 and the associated pressure increase in the damping space 19, the damping seal 24 is compressed, as indicated by dashed lines in FIG. 4. As a result, the damping seal 24 lifts up from the damping pin 18 and an annular ventilation duct 5 is generated between the damping seal 24 and the damping pin 18, through which ventilation duct 5 the air which is enclosed in the damping volume 19 can flow out again. A gas spring with a progressive spring constant is again formed in the stroke space 9 as a result of the pressure loading by the working pressure $p_1$, which gas spring counteracts the compression of the damping seal 24. The function of said design is therefore again identical to that described with reference to FIG. 2.

Figure 5:
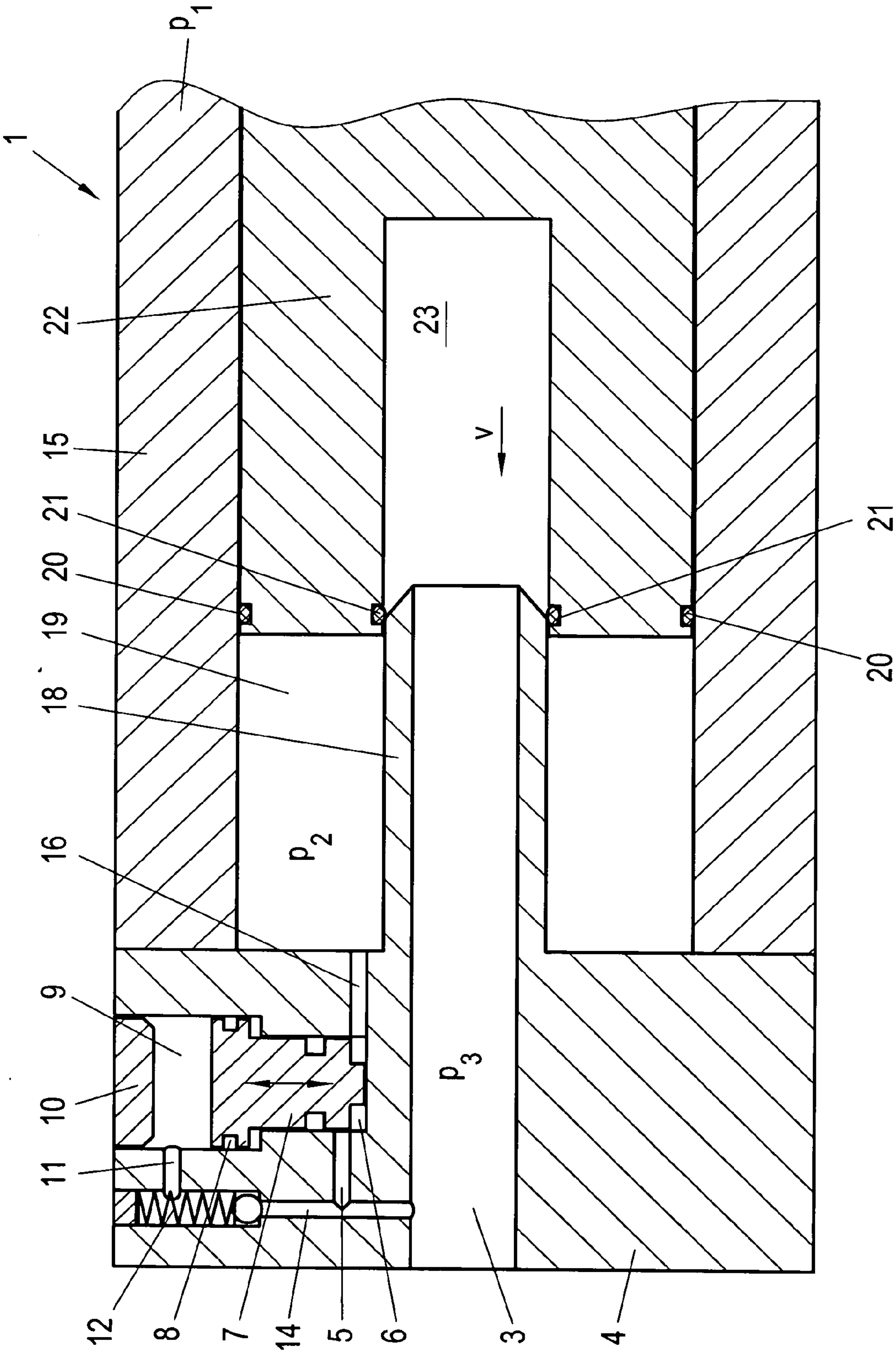

According to the above described embodiments, the working pressure $p_1$ is always acting in the stroke space 9. But it is also possible that the stroke space 9 or the adaptive gas spring, respectively, is acted on from the ventilation side, as described in the following with reference to FIG. 5. Because of the usual choking of the outlet air for regulating the speed of the cylinder piston 22, a counter pressure $p_3$ is available at the ventilation side, which is lower then the pressure on the supply side. In this embodiment the stroke space 9 is connected to the outlet duct 3, in which the ventilation pressure $p_3$ is acting, via a connecting duct 14 and a duct 11. A non-return valve 12 is again arranged in the connecting duct 14 or in the duct 11 in the cylinder cover 4, which non-return valve 12 blocks in the direction of the ventilation pressure $p_3$. For balancing the now lower pressure in the stroke space 9 of the adaptive gas spring, the stroke element, here again a damping piston 7, may be designed with different piston faces. Until the cylinder piston 22 runs onto the damping pin 18, the pressure $p_2$ in the damping volume 19 and the ventilation pressure $p_3$ in the outlet duct 3 are the same. The ventilation pressure $p_3$ acts also in the stroke space 9 via the connecting duct 14, the non-return valve 12 and the duct 11. The ventilation pressure $p_3$ in the outlet duct 3 drops sharply, when the damping device 21 closes off the damping volume 19. But this pressure is retained in the stroke space 9 because of the non-return valve 12. The side 6 of the damping piston 7 is again acted on with the rising pressure $p_2$ in the damping volume 19 and the opposite side of the damping piston 7 is acted on with the ventilation pressure $p_3$ as before the start of the damping. The functioning of this end position damping arrangement is otherwise identical to that described with reference to FIG. 2, whereas the adaptive gas spring is now dependent from the ventilation pressure $p_3$.

The adaptive gas springs of the end position damping arrangements according to FIGS. 3 and 4 may of course also be acted on from the ventilation side, i.e. by the ventilation pressure $p_3$, as described above.

Although the above examples have been described with air as a pressure medium, it is however of course likewise possible for any other suitable gas to be used as a pressure medium instead of air.

The invention claimed is:

1. A pneumatic cylinder with a self-adjusting end position damping arrangement, comprising a cylinder housing (15) containing a movable cylinder piston (22) which divides the housing (15) into first and second variable-volume chambers (40, 50), the first chamber (40) formed in part by a first side of the piston and which contains a piston fluid at a working pressure ($p_1$) which acts on the first side of the piston, and the second chamber (50) formed in part by an opposite second side of the piston and containing said end position damping arrangement in which a damping volume (19) which is delimited by the non-pressurized side of the cylinder piston (22) is formed in the region of the end position of the cylinder piston (22) as a result of the movement of the cylinder piston (22), said damping volume containing fluid at a damping pressure ($P_2$), wherein the end position damping arrangement comprises a stroke space (9) which is delimited by a movable stroke element (7, 24) and a part of the pneumatic cylinder (1), with a connecting duct (14) which extends from the stroke space (9) to the first chamber (40) containing the fluid at working pressure ($P_1$) which acts on the cylinder piston (22) or to ventilation pressure ($P_3$) in an outlet duct (3), the stroke element (7, 24), which is movable inside the stroke space, being acted on at a side facing toward the stroke space (9) by the working pressure ($P_1$) and on an opposite side being acted on by damping pressure ($P_2$) in the damping volume (19) via a damping duct (16), including a non-return valve (12) in the connecting duct (14) upstream of the stroke space (9), which non-return valve (12) blocks in the direction of the working pressure ($P_1$) or ventilation pressure ($P_3$), respectively, and encloses an air volume in the stroke space (9) and generates a gas spring effect caused by the movement of the stroke element (7, 24) and including a ventilation duct (5) which can be opened by means of the movable stroke element (7, 24) and which is connected to the outlet duct (3), whereas the stroke element (7, 24) is controls the opening of the ventilation duct (5) depending on the damping pressure ($P_2$).

2. The pneumatic cylinder according to claim 1, including a damping pin (18) which extends in an axial direction into the cylinder housing (15) in the region of the end stop of the cylinder piston (22), and the cylinder piston (22) is formed with a recess (23) which can receive the damping pin (18).

3. The pneumatic cylinder according to claim 1, wherein the outlet duct (3) is positioned laterally on the cylinder housing (15) and axially spaced apart from a cylinder cover (4).

4. The pneumatic cylinder according to claim 3, wherein the stroke element is formed as a damping piston (7) which is mounted in a guided fashion in the stroke space (9).

5. The pneumatic cylinder according to claim 4, wherein the stroke space (9) is in a cylinder cover (4) which closes off the pneumatic cylinder (1).

6. The pneumatic cylinder according to claim 4, wherein the stroke space (9) is in the piston (22).

7. The pneumatic cylinder according to claim 2, including an elastic sealing element (24) as a stroke element between the damping pin (18) and cylinder piston (22), with the sealing element (24) being hollow and being arranged in the cylinder piston (22).

8. The pneumatic cylinder according to claim 1, including a ventilation opening (17) on the pneumatic cylinder (1), which ventilation cross section (17) is connected to the damping volume (19).

9. The pneumatic cylinder according to claim 1, including a self-adjusting end position damping arrangement at both end positions of the cylinder piston (22).

10. A method for self-adjusting end position damping of a cylinder piston which moves in a cylinder housing of a pneumatic cylinder and is subjected on a first side by a working pressure ($P_1$), and by way of an opposite second side forms a damping volume in a region of an end position of the cylinder piston as a result of movement of the cylinder piston, said cylinder housing defining a stroke space in which a stroke element moves, said method comprising the steps of:

moving the cylinder piston towards the end position to generate a damping pressure ($P_2$) in the damping volume, supplying said damping pressure ($P_2$) to a first end of the stroke space to act on a first end of the stroke element, supplying said working pressure ($P_1$) to an opposite second end of the stroke space to act on an opposite second end of the stroke element, moving said stroke element based on pressures ($P_1$) and ($P_2$) to open or close a ventilation duct which extends between the stroke space and an outlet duct.

11. A pneumatic cylinder having self-adjusting end position damping comprising:

a cylinder housing having first and second ends, an end cover at said second end of said cylinder housing, and a piston which is moveable in said cylinder housing to define first and second variable-volume chambers on opposite sides thereof, said first chamber containing a fluid at working pressure ($p_1$), said piston moving toward said end cover by said working pressure ($P_1$) in said cylinder housing and defining a damping volume with said end cover, said end cover defining an outlet duct for the discharge of fluid from within said cylinder housing, a stroke chamber, a ventilation duct which connects a first end of said stroke chamber with said outlet duct, a damping duct which connects said first end of said stroke chamber with said damping volume, a connecting channel which extends from a second end of said stroke chamber to said first chamber containing working pressure ($P_1$), and a non-return valve in said connecting channel which prevents fluid flow out of said stroke chamber, and a damping piston in said stroke chamber for controlled movement therein based on said working pressure ($P_1$) and said damping pressure ($P_2$) acting on opposite ends thereof, controlled movement of said damping piston relative to said ventilation duct controlling the flow of fluid from the stroke chamber to the outlet duct and thus the lowering of the damping pressure ($P_2$) and the movement of the piston towards the end cover.

12. The pneumatic cylinder according to claim 11, wherein said piston defines a recess facing the end cover, and wherein said end cover includes a damping pin which extends towards said piston to fit with said recess, said outlet duct extending in said damping pin.

13. The pneumatic cylinder according to claim 11, wherein said cylinder housing includes a connecting duct which communicates with said connecting channel.

* * * * *